(12) United States Patent
Jarmon

(10) Patent No.: US 10,406,556 B2
(45) Date of Patent: Sep. 10, 2019

(54) ASSEMBLY AND METHOD FOR TRANSFER MOLDING

(71) Applicant: UNITED TECHNOLOGIES CORPORATION, Farmington, CT (US)

(72) Inventor: David C. Jarmon, Kensington, CT (US)

(73) Assignee: UNITED TECHNOLOGIES CORPORATION, Hartford, CT (US)

(*) Notice: Subject to any disclaimer, the term of this patent is extended or adjusted under 35 U.S.C. 154(b) by 471 days.

(21) Appl. No.: 15/029,312

(22) PCT Filed: Oct. 14, 2014

(86) PCT No.: PCT/US2014/060400
§ 371 (c)(1),
(2) Date: Apr. 14, 2016

(87) PCT Pub. No.: WO2015/057647
PCT Pub. Date: Apr. 23, 2015

(65) Prior Publication Data
US 2016/0250660 A1 Sep. 1, 2016

Related U.S. Application Data

(60) Provisional application No. 61/890,556, filed on Oct. 14, 2013.

(51) Int. Cl.
C03B 19/02 (2006.01)
B05D 1/00 (2006.01)
B05C 1/00 (2006.01)

(52) U.S. Cl.
CPC ............ B05D 1/00 (2013.01); B05C 1/003 (2013.01); C03B 19/02 (2013.01); C03B 19/025 (2013.01); B05D 2203/30 (2013.01)

(58) Field of Classification Search
CPC ..... C03B 19/02; C03B 19/025; C03B 11/005; B29C 45/02; B29C 70/48
(Continued)

(56) References Cited

U.S. PATENT DOCUMENTS 3,725,023 A 4/1973 Parris
4,428,763 A 1/1984 Layden
(Continued)

FOREIGN PATENT DOCUMENTS

EP 481629 A1 4/1992
EP 367711 B1 3/1993
EP 866041 B1 6/2002

OTHER PUBLICATIONS

Supplementary European Search Report for European Patent Application No. 14854538.7 completed on Apr. 20, 2017.
(Continued)

Primary Examiner — Robert C Dye
Assistant Examiner — Sonny V Nguyen
(74) Attorney, Agent, or Firm — Carlson, Gaskey & Olds, P.C.

(57) ABSTRACT

One exemplary embodiment of this disclosure relates to a transfer molding assembly including a chamber, a die within the chamber, a first gas control device configured to provide a first gas into the chamber, and a second gas control device configured to provide a second gas into the die.

15 Claims, 2 Drawing Sheets

(58) Field of Classification Search
USPC .................................. 264/29.1, 29.2, 29.6
See application file for complete search history.

(56) References Cited

U.S. PATENT DOCUMENTS

| | | | |
|---|---|---|---|
| 4,464,192 A | | 8/1984 | Layden et al. |
| 4,615,935 A | | 10/1986 | Bendig et al. |
| 4,738,902 A | | 4/1988 | Prewo et al. |
| 4,780,432 A | | 10/1988 | Minford et al. |
| 4,808,076 A | | 2/1989 | Jarmon et al. |
| 4,925,815 A | | 5/1990 | Tani et al. |
| 5,032,159 A | * | 7/1991 | Kuwabara ............ C03B 11/005 65/102 |
| 5,074,770 A | | 12/1991 | Graefe |
| 5,190,737 A | | 3/1993 | Weimer et al. |
| 5,304,031 A | | 4/1994 | Bose |
| 5,350,003 A | | 9/1994 | Sonuparlak et al. |
| 5,350,545 A | | 9/1994 | Streckert et al. |
| 5,518,385 A | | 5/1996 | Graff |
| 5,628,938 A | | 5/1997 | Sangeeta et al. |
| 5,900,311 A | | 5/1999 | Campanella et al. |
| 5,972,264 A | | 10/1999 | Malekmadani et al. |
| 6,228,453 B1 | | 5/2001 | Fareed et al. |
| 6,696,144 B2 | | 2/2004 | Holowczak et al. |
| 7,749,568 B2 | | 7/2010 | Schmidt |
| 9,840,432 B2 | * | 12/2017 | Jarmon ................... B28B 1/24 |
| 2001/0008865 A1 | * | 7/2001 | Nakayasu ............ C04B 35/565 501/88 |
| 2002/0004450 A1 | | 1/2002 | Gaffney et al. |
| 2003/0111752 A1 | | 6/2003 | Wood et al. |
| 2003/0138672 A1 | | 7/2003 | Bauer et al. |
| 2004/0134232 A1 | | 7/2004 | Kainuma et al. |
| 2004/0173948 A1 | * | 9/2004 | Pandelisev ............ B29C 43/006 264/500 |
| 2006/0197244 A1 | | 9/2006 | Simpson et al. |
| 2006/0249877 A1 | | 11/2006 | Kaneko et al. |
| 2008/0020193 A1 | | 1/2008 | Jang et al. |
| 2008/0199681 A1 | | 8/2008 | Murphy |
| 2008/0299385 A1 | | 12/2008 | Philippe et al. |
| 2009/0214781 A1 | | 8/2009 | La Forest et al. |
| 2011/0033263 A1 | | 2/2011 | Matsubayashi |
| 2011/0071013 A1 | | 3/2011 | Newton et al. |
| 2011/0071014 A1 | | 3/2011 | Kmetz et al. |
| 2012/0104641 A1 | * | 5/2012 | La Forest ............... B29C 70/48 264/29.5 |
| 2012/0148867 A1 | * | 6/2012 | Chang ................... C04B 37/026 428/627 |
| 2013/0084389 A1 | | 4/2013 | Schmidt et al. |
| 2015/0377552 A1 | * | 12/2015 | Jarmon .................. F27B 9/028 432/11 |

OTHER PUBLICATIONS

G.S. Bibbo, P.M. Benson, C.G. Pantano, "Effect of carbon monoxide partial pressure on the high-temperature decomposition of Nicalon fibre", Journal of Materials Science 26 (1991) 5075-5080.

Mark Van Roode et al. "Ceramic Gas Turbine Design and Test Experience", Progress in Ceramic Gas Turbine Development, vol. 1, ASME Press 2002.

T. Mah et al. "Thermal stability of SiC fibres (Nicalon)", Journal of Materials Science 19 (1984) 1191-1201.

* cited by examiner

ASSEMBLY AND METHOD FOR TRANSFER MOLDING

BACKGROUND

Ceramic material, glass material and other high temperature-resistance materials can provide desirable properties for use in relatively severe operating environments, such as in gas turbine engines. Often, such materials are used in ceramic matrix composites, such as fiber-reinforced silicon carbide composites. Such composites are typically fabricated using techniques such as polymer impregnation and pyrolysis (PIP), chemical vapor deposition (CVD), and chemical vapor infiltration (CVI), as examples. Ceramic matrix composites also include fiber reinforced glass and glass-ceramic composites. Such composites are typically fabricated by hot pressing. Another known technique is transfer molding. In a typical transfer molding process, a fiber preform is provided into a die, and a softened glass or glass/ceramic material is impregnated into the preform.

SUMMARY

One exemplary embodiment of this disclosure relates to a transfer molding assembly including a chamber, a die within the chamber, a first gas control device configured to provide a first gas into the chamber, and a second gas control device configured to provide a second gas into the die.

In a further embodiment of any of the above, the assembly includes a controller in communication with the first gas control device and the second gas control device, the controller configured to regulate a rate at which the first and second gases are provided into the chamber and the die, respectively.

In a further embodiment of any of the above, the first gas control device is in communication with a source of the first gas, and wherein the second gas control device is in communication with a source of the second gas.

In a further embodiment of any of the above, a passageway leads from the source of the second gas directly to an interior of the die.

In a further embodiment of any of the above, the interior of the die includes a molding cavity interconnected with a reservoir, and wherein a preform is provided in the molding cavity, and a material is provided in the reservoir.

In a further embodiment of any of the above, the preform includes silicon carbide (SiC) fibers.

In a further embodiment of any of the above, the material is a glass-based material.

In a further embodiment of any of the above, the glass-based material is heated and injected into the preform to form a glass-based composite material.

In a further embodiment of any of the above, the second gas inhibits a potential reaction of the preform in response to an increase in temperature.

In a further embodiment of any of the above, the preform is expected to potentially release a third gas in response to an increase in temperature, and wherein the second gas is the same as the third gas.

In a further embodiment of any of the above, the second gas has a different chemical composition than the first gas.

In a further embodiment of any of the above, the first gas includes argon (Ar), and wherein the second gas includes carbon monoxide (CO).

In a further embodiment of any of the above, the first gas is provided into the chamber at a rate of about fifteen times a rate the second gas is provided into the chamber.

In a further embodiment of any of the above, the die includes a graphite material.

In a further embodiment of any of the above, the assembly includes a heater operable to heat the die.

Another exemplary embodiment of this disclosure relates to a method including providing a first gas into a chamber, and providing a second gas into a die within the chamber. The second gas has a different chemical composition than the first gas.

In a further embodiment of any of the above, the second gas is provided into the die during a transfer molding process.

In a further embodiment of any of the above, the die includes a preform expected to potentially release a third gas during the transfer molding process, wherein the second gas has the same chemical composition as the third gas.

In a further embodiment of any of the above, the first and second gases are provided such that the second gas is less than or equal to 12.5% of the volume of the chamber.

In a further embodiment of any of the above, the first and second gases are provided such that the second gas is less than or equal to 7% of the volume of the chamber.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

BRIEF DESCRIPTION OF THE DRAWINGS

The drawings can be briefly described as follows.

DETAILED DESCRIPTION

Figure 1:
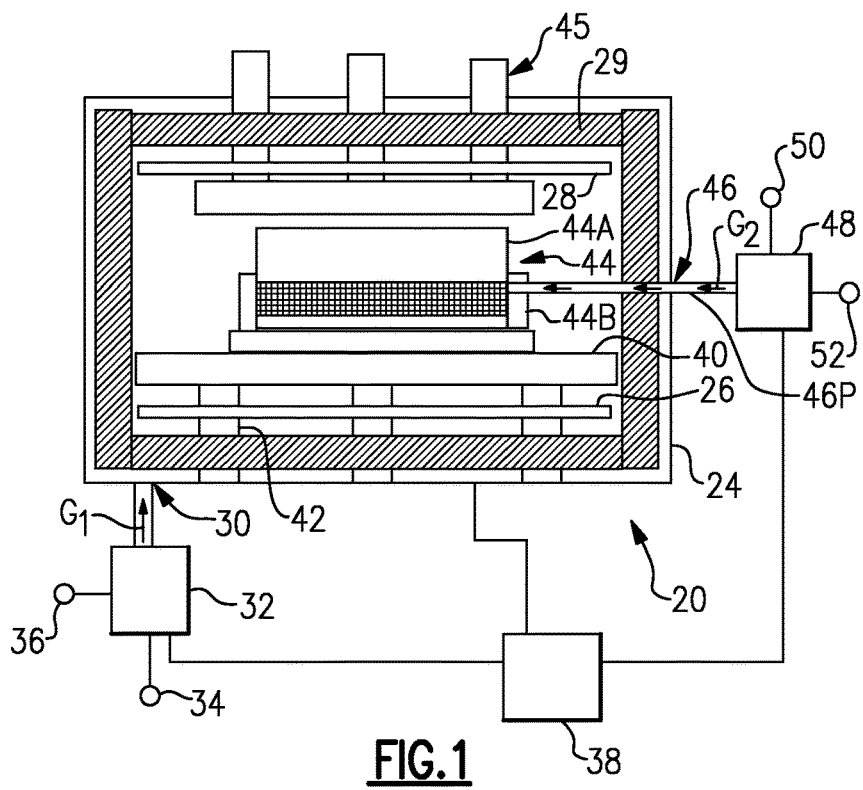
FIG. 1 schematically illustrates an example transfer molding assembly.

FIG. 1 schematically illustrates an example assembly 20 that can be used in conjunction with a method for processing a process-environment-sensitive material (hereafter "material"), which is a material that is formed into a desired article geometry at high temperatures in a controlled environment, such as under vacuum and/or inert cover gas (e.g., argon). Such materials require high temperatures to enable formation and consolidation into the desired geometry and a controlled environment to manage reactions that can undesirably alter the chemistry of the material.

In non-limiting examples, the material can be a ceramic-based material, a glass-based material or a combination of a ceramic/glass-based material. One example includes silicon carbide fiber reinforced ceramic-glass matrix materials. The ceramic-glass matrix can be lithium-aluminosilicate with boron or barium magnesium aluminosilicate, for example. The fibers can include one or more interface layers, such as carbon or boron nitride layers. These and other process-environment-sensitive materials can be processed into an article using the assembly 20.

In the illustrated example, the article being formed is an annular engine component. Example annular components include turbine rings, rub strips, seals, acoustic tiles, combustor liners, shrouds, heat shields, etc. It should be understood that this disclosure is not limited to annular articles, and extends to articles having other shapes.

In this example, the assembly 20 is a transfer molding assembly. The assembly 20 includes a chamber 24 and a plurality of heaters 26, 28 provided therein. While only one chamber 24 is illustrated, the assembly 20 could include additional chambers.

The chamber 24 is connected, through a port 30, to a first gas environment control device 32, which is in turn in communication with a vacuum pump 34 and/or a pressurized source 36 of a first gas $G_1$. In one example, the first gas $G_1$ includes argon (Ar). In another example, the first gas $G_1$ is predominantly argon (Ar) or substantially pure argon (Ar).

The first gas environment control device 32 is controlled by command of a controller 38, which is configured to control evacuation of, and process gas flow into, the chamber 24. Thus, for a given process having a predefined controlled gas environment, the controller 38 can purge the interior of the chamber 24 of air, evacuate the interior to a desired pressure and/or provide the chamber with a supply of the first gas $G_1$ at a desired rate.

Figure 2:
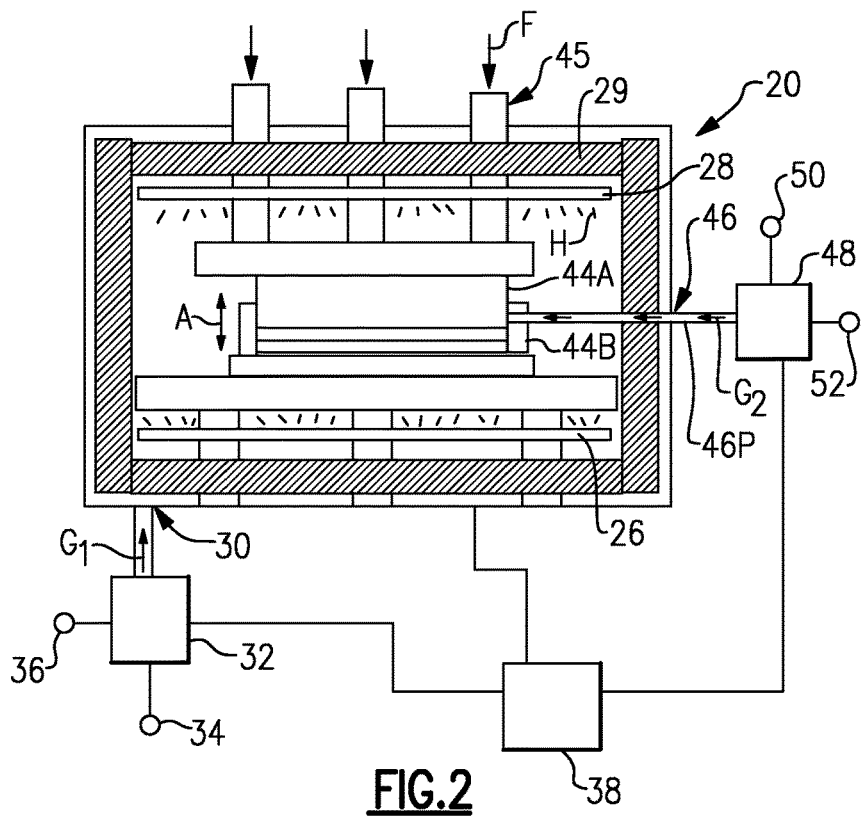
FIG. 2 schematically illustrates an example transfer molding assembly with a press activated.

The assembly 20 further includes a support plate 40 located within the chamber 24, which may itself be supported by a plurality of legs 42. A die 44 is provided on the support plate 40, and includes an injection ram 44A configured to translate relative to a base 44B, in a generally up-and-down direction A, in response to a force F (FIG. 2) from an actuator assembly 45. The actuator assembly 45 may include a mechanically actuated piston, as is known in the art. While an actuator assembly 45 is illustrated in FIGS. 1-2, it should be understood that this disclosure does not require an actuator assembly 45, and extends to disclosures using passive (rather than active) injection techniques.

Figure 3:
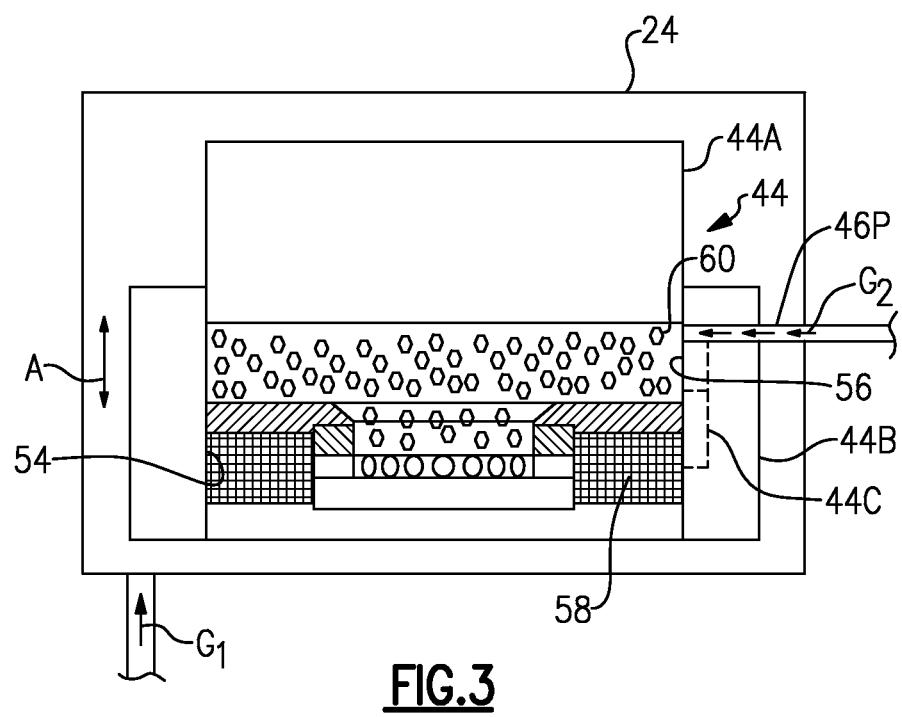
FIG. 3 schematically illustrates the detail of an example die.

As illustrated in FIG. 3, the die 44 has an interior portion including a molding cavity 54 and a reservoir 56 interconnected with the molding cavity 54. The injection ram 44A in one example is sealed against the side walls of the reservoir 56 to prevent material from escaping during injection. Optionally, there may be an exit port at the bottom of the reservoir 56, or at the bottom of the molding cavity 54, for directing excess material away from the molding cavity 54.

In this example, the die 44 is connected, through a port 46, to a second gas environment control device 48, which is in turn in communication with a vacuum pump 50 and/or a pressurized source 52 of a second gas $G_2$. Here, the port 46 includes a passageway 46P, which may include one or more conduits, leading from the source 52 directly to the interior portion of the die 44. The die 44 may include channels/grooves 44C formed therein for directing the second gas $G_2$ from the passageway 46P to desired locations within the die 44.

In one example, the second gas $G_2$ includes carbon monoxide (CO). In another example, the second gas $G_2$ is predominantly carbon monoxide (CO), or substantially pure carbon monoxide (CO). The second gas environment control device 48 is controlled by command of a controller 38, and functions in substantially the same manner as the first gas environment control device 32.

As mentioned above, a transfer molding is a process in which a material is injected into a preform to form a composite article. In one example process, an article is formed first by inserting a preform 58, which includes a plurality of fibers, into the molding cavity 54. Next, a material 60 is provided in the reservoir 56. In one example, the material 60 is initially in the form of a plurality of glass cutlets, as illustrated in FIG. 3.

Figure 4:
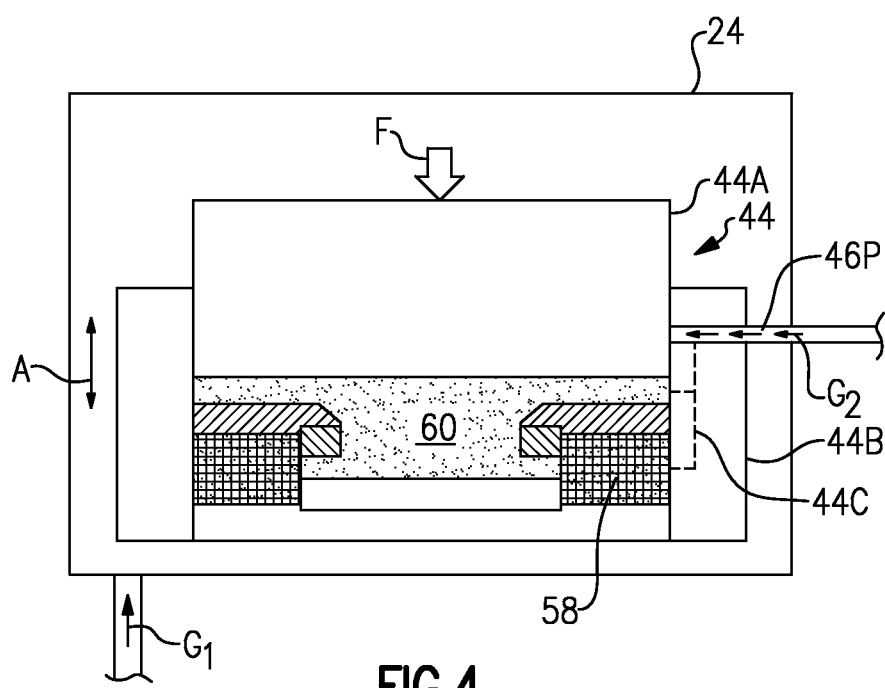
FIG. 4 schematically illustrates the detail of an example die with the press activated.

In one example transfer molding process, the controller 38 activates the heaters 26, 28 to increase the temperature within the chamber 24. In response, the temperature of the material 60 rises, which decreases the viscosity of the material. After the material 60 softens to an acceptable viscosity, the controller 38 activates the actuator assembly 45, which applies a downward force F onto the injection ram 44A, as generally illustrated in FIGS. 2 and 4. In response, the material 60 is injected into the preform 58. After injection, the preform 58 and material 60 are allowed to cool, and may undergo further processing, as needed, to prepare the article for use.

Depending on the composition and properties of the die 44, the preform 58, and the material 60, the heat H and force F can cause a chemical reaction that degrades the article during use of the assembly 20.

In one example, the preform 58 includes silicon carbide (SiC) fibers. Example silicon carbide (SiC) fibers can include Nicalon®. Typical transfer molding processes are performed under temperatures of about 1200-1600° C. Under such temperatures, silicon carbide (SiC) fibers can decompose and release carbon monoxide (CO) as a decomposition byproduct. The decomposition of the fibers can thus ultimately debit the properties of the final article. Accordingly, in one example of this disclosure, the second gas control device 48 is configured to supply a flow, or an overpressure, of carbon monoxide (CO) into the interior of the die 44. This partial pressure of carbon monoxide (CO) inhibits (e.g., at least reduces, if not altogether eliminates) the potential release of carbon monoxide (CO) from the silicon carbide (SiC) fibers (of the preform 58).

As mentioned above, the transfer molding process typically takes place under relatively high temperatures (e.g., about 1200-1600° C.) and pressures. In one example of this disclosure, the level of carbon monoxide (CO) within the chamber 24 is limited to be below a predetermined threshold. In this example, the controller 38 instructs each of the first and second gas control devices 32, 48 to essentially dilute the level of the carbon monoxide (CO) in the chamber 24 with the first gas $G_1$, which is argon (Ar) in this example.

The lower explosive limit of carbon monoxide (CO) in air is about 12.5% by volume and can serve as the threshold or as a value upon which the threshold is based. Thus, in one example, the first and second gas control devices 32, 48 are controlled such that percentage of carbon monoxide (CO) within the chamber 24 is less than or equal to 12.5%, with the remainder (e.g., 87.5%) being argon (Ar). In another example, the volume percentage of carbon monoxide (CO) is controlled to be less than or equal to 7% of chamber 24, with the remainder (e.g., 93%) argon (Ar). In this example, the first gas control device 32 provides a flow of argon (Ar) at a rate of about fifteen times the flow of carbon monoxide (CO). Reference to the volume "within the chamber" includes the volume within the interior of the die 44 (because the die 44 itself is within the chamber 24).

Accordingly, this disclosure provides a sufficient overpressure of a reaction inhibition gas (e.g., CO), directed where the reaction is possible (e.g., to the interior portion of the die 44), while maintaining safety during the transfer molding process by limiting the overall concentration of the reaction inhibition gas within the chamber.

While silicon carbide (SiC) fibers are mentioned as an example preform 58, this disclosure extends to other materials that are sensitive to decomposition at elevated temperatures. Further, while the above example specifically mentions argon (Ar) and carbon monoxide as the first and second gases $G_1$, $G_2$, it should be understood that this disclosure extends to other gases. In particular, the second gas $G_2$ may be another gas besides carbon monoxide (CO) that corresponds to (e.g., matches) a potential byproduct of a material undergoing a transfer molding process.

Although the different examples have the specific components shown in the illustrations, embodiments of this disclosure are not limited to those particular combinations. It is possible to use some of the components or features from one of the examples in combination with features or components from another one of the examples. Further, as used herein, the term "about" is not a boundaryless limitation on the corresponding quantities, but instead imparts a range consistent with the way the term "about" is used by those skilled in this art.

One of ordinary skill in this art would understand that the above-described embodiments are exemplary and non-limiting. That is, modifications of this disclosure would come within the scope of the claims. Accordingly, the following claims should be studied to determine their true scope and content.

What is claimed is:

1. A transfer molding assembly, comprising:
   a chamber;
   a die within the chamber;
   a heater operable to heat the die;
   a first gas control device configured to provide a first gas into the chamber; and
   a second gas control device configured to provide a second gas into the die during a transfer molding process in which the heater heats the die, wherein the second gas has a different chemical composition than the first gas;
   wherein the first gas control device is in communication with a source of the first gas, and wherein the second gas control device is in communication with a source of the second gas;
   wherein an interior of the die includes a molding cavity interconnected with a reservoir, and wherein a preform is provided in the molding cavity and a material is provided in the reservoir; and
   wherein the second gas inhibits a potential reaction of the preform in response to an increase in temperature.

2. The assembly as recited in claim 1, including a controller in communication with the first gas control device and the second gas control device, the controller configured to regulate a rate at which the first and second gases are provided into the chamber and the die, respectively.

3. The assembly as recited in claim 1, wherein a passageway leads from the source of the second gas directly to the interior of the die.

4. The assembly as recited in claim 1, wherein the preform includes silicon carbide (SiC) fibers.

5. The assembly as recited in claim 1, wherein the material is a glass-based material.

6. The assembly as recited in claim 5, wherein the glass-based material is heated and injected into the preform to form a glass-based composite material.

7. The assembly as recited in claim 1, wherein the preform is capable of releasing a third gas during the transfer molding process in which the preform is subjected to an increase in temperature, and wherein the second gas is the same as the third gas.

8. The assembly as recited in claim 1, wherein the first gas includes argon (Ar), and wherein the second gas includes carbon monoxide (CO).

9. The assembly as recited in claim 8, wherein the first gas is provided into the chamber at a rate of about fifteen times a rate the second gas is provided into the chamber.

10. The assembly as recited in claim 8, wherein the first gas is substantially pure argon (Ar), and wherein the second gas is substantially pure carbon monoxide (CO).

11. The assembly as recited in claim 1, wherein the die includes a graphite material.

12. A method comprising:
    providing a first gas into a chamber; and
    providing a second gas into a die within the chamber, the second gas having a different chemical composition than the first gas, wherein the second gas is provided into the die during a transfer molding process in which the die is heated, and wherein the die includes a preform is capable of releasing a third gas during the transfer molding process in which the preform is subjected to an increase in temperature, wherein the second gas has the same chemical composition as the third gas.

13. The method as recited in claim 12, wherein the first and second gases are provided such that a volume percentage of the second gas is less than or equal to 12.5% of the volume of the chamber.

14. The method as recited in claim 12, wherein the first and second gases are provided such that a volume percentage of the second gas is less than or equal to 7% of the volume of the chamber.

15. The method as recited in claim 12, wherein the die includes an injection ram, and the second gas is provided into the die as a downward force is applied onto a material within the die by the injection ram.

* * * * *